(12) United States Patent
Xiao et al.

(10) Patent No.: US 9,258,314 B1
(45) Date of Patent: Feb. 9, 2016

(54) DETECTION OF ANOMALOUS INSTANCES THROUGH DYNAMIC FEATURE SELECTION ANALYSIS

(71) Applicant: Google Inc., Mountain View, CA (US)

(72) Inventors: Fei Xiao, Mountain View, CA (US);
Ioan Marius Pungaru, Mountain View, CA (US); Bill Davis, Mountain View, CA (US); Michael McNally, Mountain View, CA (US); Vinay Somasundara Rao, Mountain View, CA (US); Anurag Gupta, Mountain View, CA (US)

(73) Assignee: Google Inc., Mountain View, CA (US)

( * ) Notice: Subject to any disclaimer, the term of this patent is extended or adjusted under 35 U.S.C. 154(b) by 393 days.

(21) Appl. No.: 13/842,511

(22) Filed: Mar. 15, 2013

(51) Int. Cl.
*G06F 11/00* (2006.01)
*G06Q 40/00* (2012.01)
*H04L 29/06* (2006.01)

(52) U.S. Cl.
CPC ...................................... *H04L 63/14* (2013.01)

(58) Field of Classification Search
CPC ............................. H04L 63/14; H04L 63/1483
See application file for complete search history.

(56) References Cited

U.S. PATENT DOCUMENTS

| | | | |
|---|---|---|---|
| 4,139,894 A * | 2/1979 | Reitsma | G06F 7/494 708/685 |
| 8,666,841 B1 * | 3/2014 | Claridge et al. | 705/26.35 |
| 2005/0222929 A1 * | 10/2005 | Steier et al. | 705/35 |
| 2010/0094767 A1 * | 4/2010 | Miltonberger | 705/325 |
| 2011/0270756 A1 * | 11/2011 | Tullis | G06Q 20/10 705/44 |
| 2015/0026027 A1 * | 1/2015 | Preiss et al. | 705/35 |

* cited by examiner

*Primary Examiner* — Dede Zecher
*Assistant Examiner* — Abdullah Almamun
(74) *Attorney, Agent, or Firm* — Foley & Lardner LLP; John D. Lanza; James De Vellis (57) ABSTRACT

This specification describes technologies relating to detecting anomalous user accounts. A computer implemented method is disclosed which evaluates an unknown status user account. The method described compares features associated with a plurality of known anomalous user accounts stored in a database to features present in the unknown account. A correlation value corresponding to the probability of a specific feature occurring in a particular anomalous user account is calculated and a dependence value corresponding to the degree of dependence between the given feature and at least one other feature is also calculated. A subset of features in the unknown account is generated comprising those features that possess a correlation value less than a threshold value and a dependence value below a maximum correlation value. A risk score for the unknown account is calculated by selecting those features from the subset that maximizes the correlation value. The unknown account is then reviewed by an account reviewer if the risk score exceeds a threshold value.

15 Claims, 7 Drawing Sheets

DETECTION OF ANOMALOUS INSTANCES THROUGH DYNAMIC FEATURE SELECTION ANALYSIS

BACKGROUND

A modern feature of the Internet is that many Internet service providers, publishers, and social networks provide user accounts. These user accounts allow users to exchange communications inside the network or with other networks or services. This is a feature that is useful and important to the overall marketability and usability of the service. However, some users obtain accounts with the intent to engage in malicious or unwarranted activity. Unsolicited mail accounts, or spam accounts, are used to direct advertisements and online marketing promotions to users who have not expressed any interest in the product, nor have asked to be put on a general product mailing list. It is a difficult and time consuming task to distinguish these anomalous accounts from valid accounts with similar features.

As used herein, the term "Internet account" refers to, generally, user accounts provided by a service provider. Internet accounts may include, for example, e-mail accounts, web site access accounts, comment systems for articles, reviews for music, video and graphics, information feeds, or other material. Also as used herein the term "internet service provider" refers, generally, to a provider of Internet services over a communication network, such as the Internet. For example, an internet service provider may provide an account which includes access to content (e.g., articles, discussion threads, music, video, graphics, information feeds, web sites, etc.), and the ability to contact other members of the service or a different service. In another example, a publisher may provide a message sending service. In yet another example, a service provider grants access to a social network web site.

The term "anomalous account" refers, generally, to an account which is engaged in actions that constitute a violation of the terms and conditions of the Internet Service, or that is engaged in unwarranted, disruptive, abusive, or other actions or activities contrary to proposed usage guidelines, rules or laws. Non-limiting examples of anomalous accounts are spam email accounts, spam member accounts, fraudulent social network accounts.

SUMMARY

This specification describes technologies relating to detecting anomalous instances, such as but not limited to user account. A computer implemented method is disclosed which evaluates an unknown status user account. The method described includes steps to compare features associated with a plurality of known anomalous user accounts stored in a database to features present in the unknown account. A correlation value corresponding to the probability of a specific feature occurring in a particular anomalous user account is calculated and a dependence value corresponding to the degree of dependence between the given feature and at least one other feature is also calculated. A subset of features in the unknown account is generated comprising those features that possess a correlation value below a threshold value and a dependence value below a maximum correlation value. A risk score for the unknown account is determined by calculating, such as by using a Naïve Bayesian algorithm, the combined probability that each of the features in the feature set selected would independently preset in a valid account. The unknown account is then reviewed by an account reviewer if the risk score exceeds a threshold value.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DESCRIPTION

In accordance with one or more implementations, the present application regards a data-driven approach to uncover anomalous user accounts within a user base. As used herein, the term "user base" regards, generally, a number of individual user accounts within a group sharing the same services at a given time or during a time period.

It is recognized by the inventors that anomalous user instances within the user base share common characteristics or features. By recognizing the features that are commonly associated with an anomalous instance, a spam account detection system and method are implemented to evaluate one or more features of an account through the use of statistical learning models to determine if the account is anomalous. More particularly, the present application includes a dynamic feature selection function that selects one or more features, substantially automatically, and applies statistical tests and/or ensemble learning to correlate their occurrence in an anomalous account. Accordingly, the system and method according to the present application are highly precise, are difficult to evade, and have a broad coverage. The teachings herein provide a solution for identifying anomalous user accounts by leveraging statistical information regarding user account features and for aggregating those statistics into representations of the relationship between those features and an anomalous account.

A number of Internet services are provided by public, private and commercial organizations. Services such as e-mail, content management systems, social network systems, and web forums, are provided to the public free of charge. Designing, deploying, and maintaining such services, however, incur significant expenses. Such services must have high availability, be able to serve any user who is anonymous or registered (and/or logged in), and be available from anywhere in the world.

Unfortunately, people engage in account fraud (spam), in which a person or a machine (via a software program) registers an account and uses that account to engage in behavior in violation of the account services agreement. In one example, persons or machines ("bots") register for an account, such as an e-mail account, and send malicious or non-requested advertising content to other users. Alternatively, a person or bot may sign up for a social network service. This person or bot then attempts to contact other users in an attempt to distribute commercial, advertising material or other un-solicited information. One aim of spam fraud is to generate revenue to publishers, which generates charges for online advertisers without providing any real interest or return in the products advertised.

Furthermore, there is a concern that spam fraud may eventually undermine the entire business model associated with online advertising, for example, by causing advertisers to lose confidence. Accordingly, spam account detection is an important component for the well-being of many Internet services. Uncovering spam accounts can be performed in many ways and may use different network infrastructures and levels of sophistication.

Figure 1:
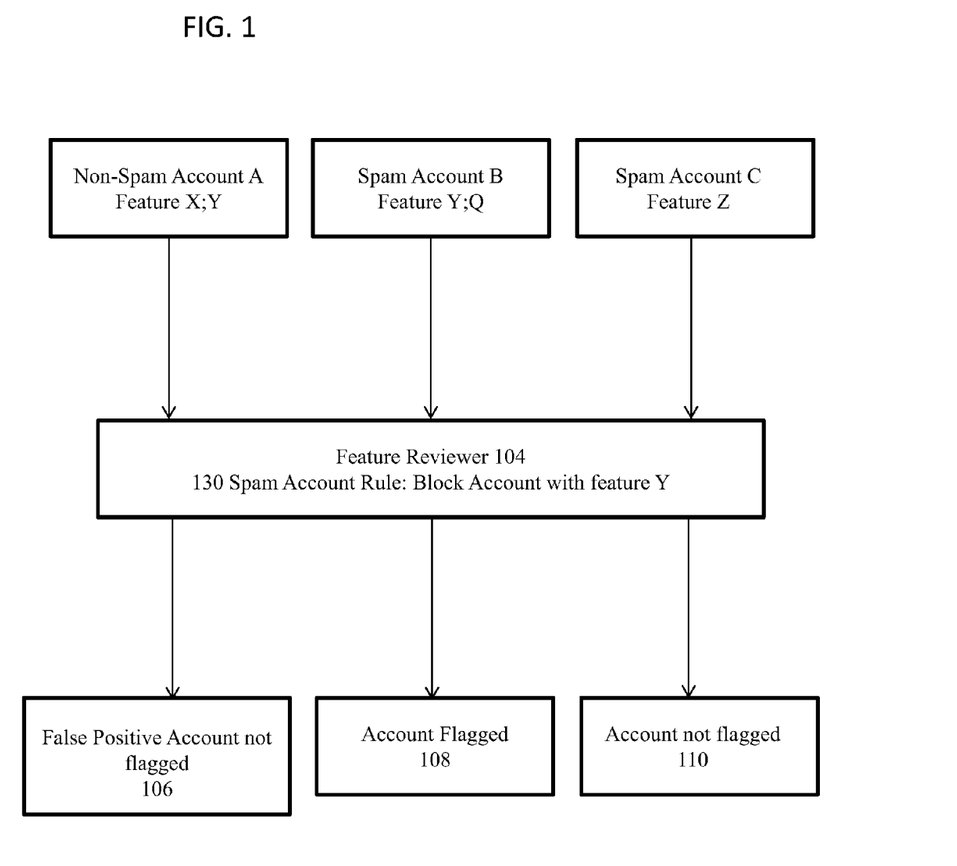
FIG. 1 is a diagram of the problem that is addressed in an embodiment.

FIG. 1 depicts an example of the problem faced in the prior art. For the sake of simplicity, the illustrated scenario includes three user accounts 102. In the example shown, the three accounts are reviewed for features or signals that inform an account reviewer (a manual reviewer or an automated system) 104 that the account is a spam account.

The term "feature" described more fully below, generally refers to a circumstance or condition of the account that is accessible or known by the service at a given time or during a time period. Determining a valid feature for use in an anomaly detection model can be challenging. Several different features might present in both anomalous and non-anomalous accounts.

As illustrated, some accounts contain feature(s) that occur in both spam and non-spam accounts. For instance, the first account (A) is a valid account having feature X which occurs in valid accounts and feature Y which is present in some spam accounts. The second account is a spam account (B) having the same feature Y; and a feature Q that only occurs in spam accounts, and the third account (C) is a spam account having only feature Z which only occurs in spam accounts. An anomaly account detecting system can develop a rule or filter 130 that flags or blocks an account as a spam account based on a detected feature. However, there are difficulties in using a single or static feature detection model. For example a detection model that uses only feature X as a spam identifier will either capture false positive accounts 106 (low precision) or only capture a small number of accounts (low coverage) 108. Furthermore, the system would fail to capture accounts with different features 110 than the ones set by a static rule.

The present system and method is configured, as an example, to review unknown accounts and determine if the account is an anomalous, or spam, account. An example representing the described method is in an embodiment illustrated in FIG. 2. It should be understood that the example used in the following description is for illustration purposes and does not limit the scope or applicability of the described subject matter. As such, while the following description focuses on account information, other anomalous instances, such as anomalous products, traffic patterns, communications and the like are envisioned by the inventors. Those skilled in the art will quickly appreciate the applicability of the subject described in the present application.

Figure 2:
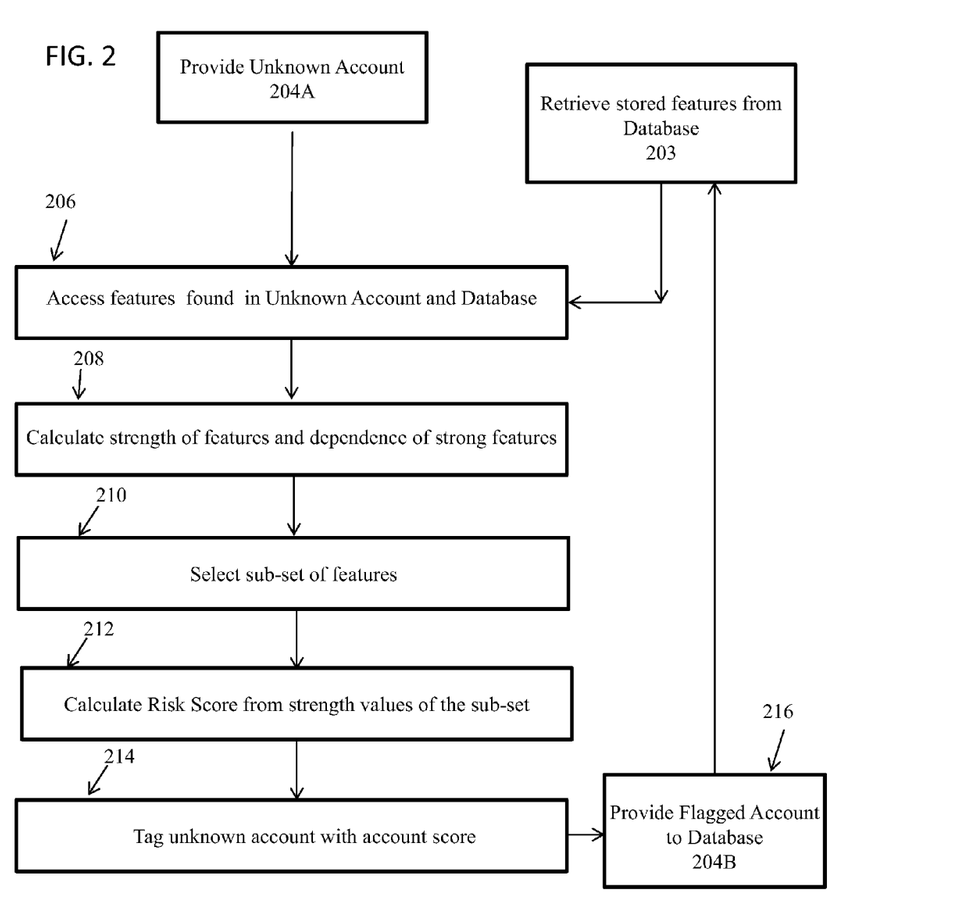
FIG. 2 is a flowchart that illustrates an example workflow in an embodiment.

In broad overview, a method according to an embodiment can be characterized as a series of steps designed to estimate the strength/conditional correlation of features found in an account of unknown status, estimate the confidence between pairs of features with at least minimal strength, dynamically select a set of "independent" features based on a selection algorithm, and calculate the spam risk score based on the naive Bayesian algorithm with the set of selected features. Similarly, the steps described are configurable as an algorithm computed by a processor executing code As illustrated in FIG. 2, An unknown account is provided at step 204A for evaluation and assigned a value corresponding to the likelihood that the account is a spam account.

Figure 2A:
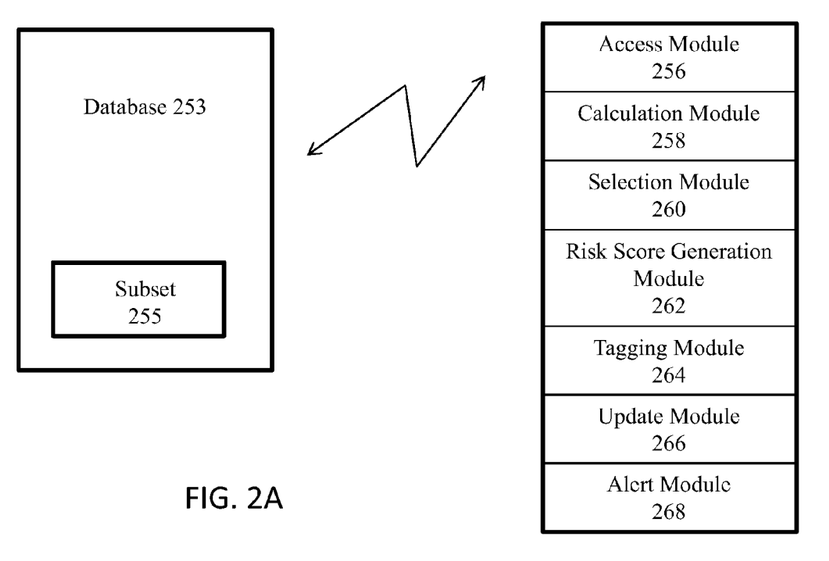
FIG. 2A is a block diagram of an example system in an embodiment.

The method, implemented by at least one access module 256 comprising code executing in a processor in which the code is configured by a computer system as illustrated in FIG. 2A, includes an accessing step 206 to access the features of the account and compare those features to a database 253 of stored features that have been collected from previous spam accounts in the database 253. In one example, a database query is executed which searches the database 253 for those features that match features in the unknown account. Once the feature set is accessed and evaluated in this manner, a correlation (conditional correlation) value is calculated using a calculating module 258 executing in the processor to configure the processor to perform a calculating step 208 in relation to each feature. More specifically, the calculation step 208 and the module 258, calculate a strength value of each feature found in the account(s) by determining the probability that the presence of the feature, or the specific value of that feature, is more likely found in connection with a spam account as opposed to a non-spam account. For example, the conditional correlation is calculated as a Pearson correlation. In this example, the strength value is calculated based on the information stored in the database 253, but other resources can be used instead of or in addition to the database 253.

A conditional confidence (dependence) value for each feature is also calculated for those features that have a conditional correlation value below a given threshold. Dependence is a value is calculated by an algorithm configured to calculate the probability that the presence of a given feature is conditional upon the presence of another feature. For a feature to be independent, that feature must not depend on the presence of another feature. It is also possible to classify a feature as independent even though the feature is weakly dependent on another feature. As such, a maximum threshold is set for the conditional confidence value.

After calculating the conditional correlation and dependence values, a selection module 260 comprising code that configures the processor to select 212 at least one of the features of the strong, independent feature set for inclusion in a probability model, and more preferably, in a Bayesian probability model. In one arrangement, the selection module 260 selects those features having a strength value above a threshold as the criteria for the selection. In a further arrangement, the selection module, operating as code, stores the selected features in a subset 255 within the database 253.

A risk score module 262, comprising code that configures to processor to generate a risk score by applying the features as input to the probability model (e.g. Bayesian probability model). The risk score module 262 includes a generating step 212 for generating the risk score using with the values in the subset 255 as inputs to a Bayesian probability model. The risk score, as used herein, is a numerical indication of the likelihood that the unknown account is a spam account.

A tagging module 264 comprising code that configures the processor includes a tagging step 214 for tagging the unknown account with the computed risk score. The tagging module 264 converts the unknown account 204A to a tagged account 204B. For example, the tagging module 264 is configured to update a table of reviewed accounts and add or update a risk score risk and the reviewed account by a unique identifier.

An update module 266 comprising code that configures the processor includes an updating step 216 for updating the database 253 with the tagged account 204B and the results of the strength and conditional confidence calculation for the features used in the probability model. In further arrangement, the updating module updates the database 253 with the reviewed account 204B and the risk score.

An alert module 268 executing in the processor includes an alert step 218 for alerting an account reviewer as to the status of the account. For example, the alert module 268 alerts a manual or automatic reviewer to review the tagged account in more detail if the risk score is above a threshold.

Data Set

In the implementation seen in FIG. 2A, the database 253 of features is stored in the form of data logs. In one example, the data logs are generated from manual review of a service provider, such as a look up table representing anomalous accounts and the features found in those accounts. Logs may be used to gain insight into commonalities found in anomalous accounts, as well as to test and evaluate the performance of one or more implementations.

In an example embodiment, spam accounts manually identified by a human reviewer are used to generate the initial data set of the database 253. Example features stored by the database 253 include unique identifiers as well as common geographical data, message headers, time stamps, usage data, bandwidth data, incoming message frequency, timestamps and the like.

In addition to spam logs, other information may be referenced, such as message size historical information and estimated data.

Strength of the Signal

Figure 3:
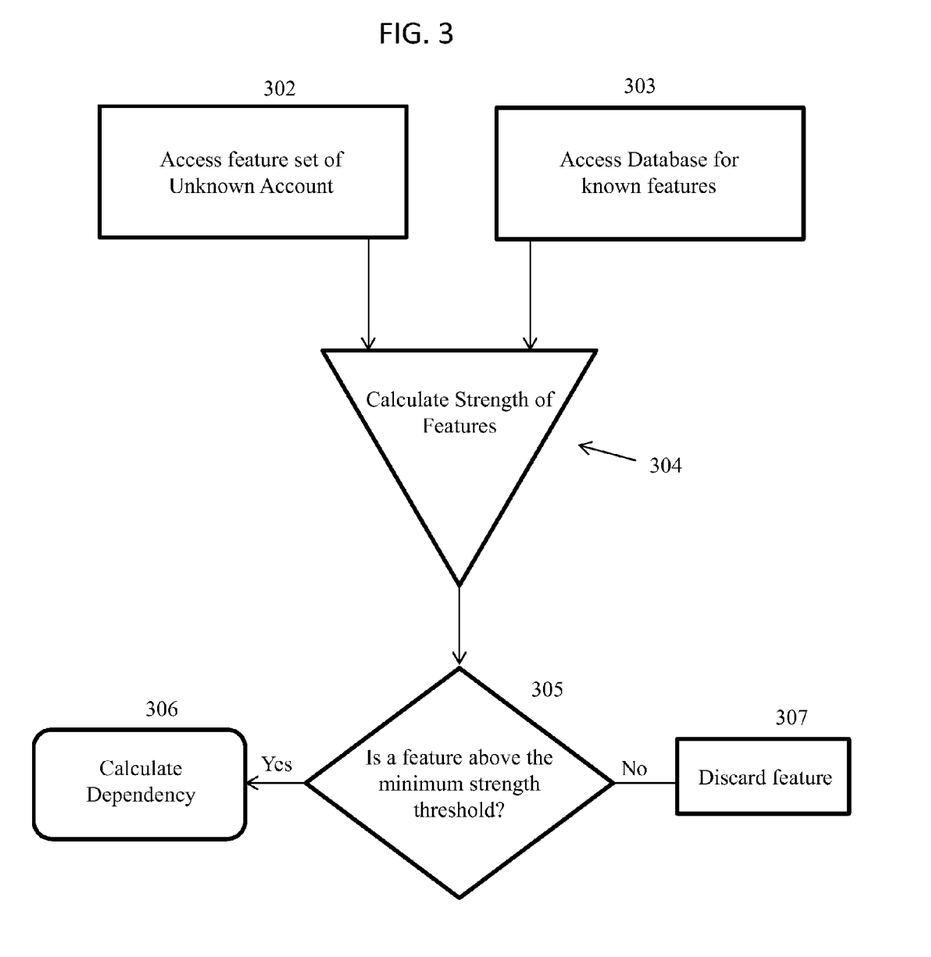
FIG. 3 is a diagram of the strong feature calculation function of the method according to an embodiment.

As seen in FIG. 3, features are accessed by an access module from the database in step 303 and the unknown account in step 302. The data accessed by the access module is used as inputs to a conditional correlation value function 304 which can be implemented in code executing in the processor, such as a conditional correlation value module. This function is used to determine the conditional correlation value of each feature 304. The features in the database 303 have historical data related to the occurrence of that particular feature in both spam and valid accounts. The features selected from the database 303 are those features that are present in the unknown account 302. In those situations where the feature is not found in the database 303, that feature is not used in the calculation.

The conditional correlation module is used to calculate the conditional probability of each feature by determining the frequency at which a particular feature appears in connection with the two different account types. If the feature occurs more frequently in connection with spam accounts then the feature is considered a strong feature. In one example, the strength of a particular feature is determined by the following algorithm:

$$S(k)=P(k|\text{anomalous})/P(k|\text{non-anomalous})$$

Where $P(k|\text{anomalous})$ is the conditional probability of feature k occurring in a anomalous account and $P(k|\text{non-anomalous})$ is the conditional probability of feature k occurring in a non-anomalous account. Such an algorithm can be implemented as part of the code comprising the conditional correlation value module.

As seen in FIG. 3, the after the conditional probability of a feature is calculated, the value is compared to a threshold value 305 by additional code executing in the processor. If the conditional value exceeds the threshold value, then the code operates to assign the feature to the anomalous feature set 306 for further evaluation. If the conditional probability (strength value) of a feature does not exceed the threshold value, that feature is discarded from the calculation by operation of the code.

Independence Value of the Features

Figure 4:
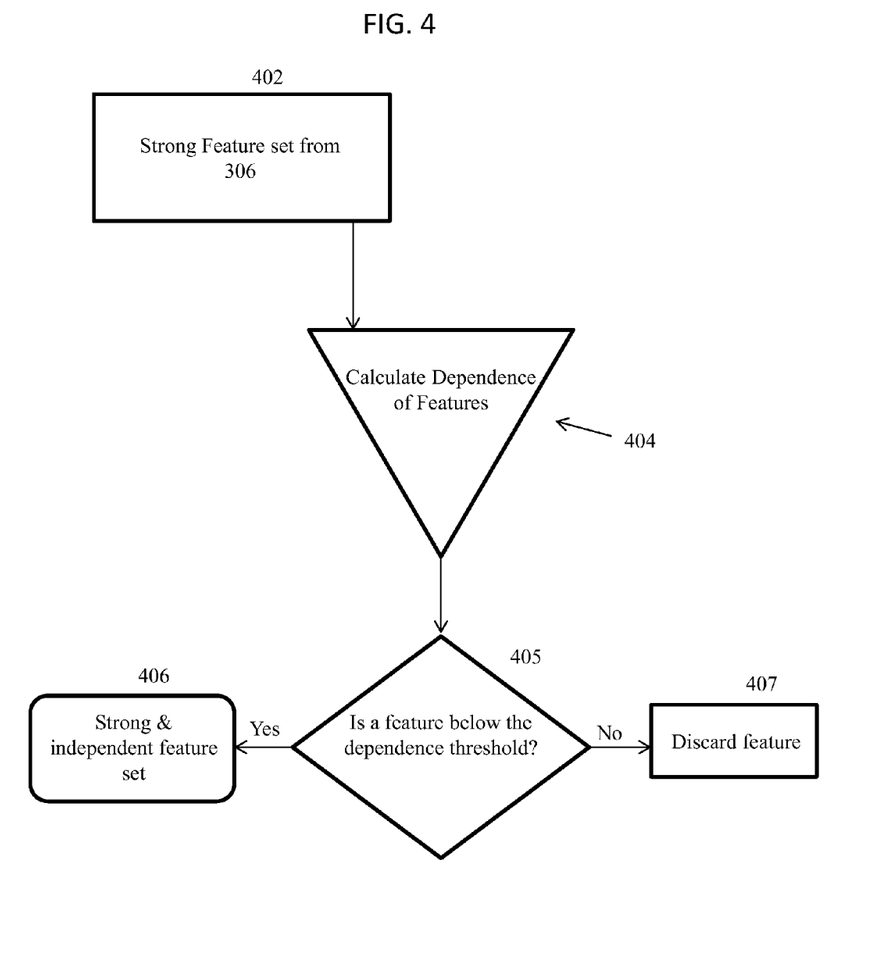
FIG. 4 is a diagram of the independence calculation function of the method according to an embodiment.

As illustrated in FIG. 4, the method of an embodiment as may be implemented by code in the form of one or more modules includes a step for calculating the conditional correlation value of a feature 404. Such a method, executed by a computer, has code configured to calculate, for each strong feature, a value representative of the conditional confidence of the feature on the presence of another feature. In the context of the illustrated example, 'dependence' or conditional confidence is a characteristic relating to the probability that the event that feature A is dependent on feature B. If the occurrence of a first event does not depend on the occurrence of another, different event, than the first event is independent. For example, one algorithm to determine conditional independence is provided by the formula:

$$P(A,B|C)=P(A|C)*P(B|C)$$

Where, A,B are features that are conditional independent, C is a class of features (normal or anomalous classes).

As seen in FIG. 4, the conditional probability of the feature is compared against a threshold value 405 by a processor configured to implement an algorithm such as above. Once the independence value for each feature is calculated, each feature is compared against a threshold value 405 by the code. If the independence value is below the threshold value, then the feature 402 is assigned to strong, independent feature set 406 and is stored in the subset 255 by the selection module 260. If a particular feature is found to be dependent on another feature, then the code operates to discard that feature from calculation.

In one arrangement of the method described, the threshold value is set so as to not require the feature to be completely independent of another feature. For example, the conditional confidence calculation function 405 can comprise code configured to calculate a Pearson correlation value for each feature based on its correlation to another feature. In one instance, if the correlation value for feature m in light of feature n, is less than 0.2, then the dependence calculation function outputs that feature m is independent. In this example, the correlation value is set to either 0, or it is passed without modification to the strong, independent feature set.

Selection of Set of Strong Features

Figure 5:
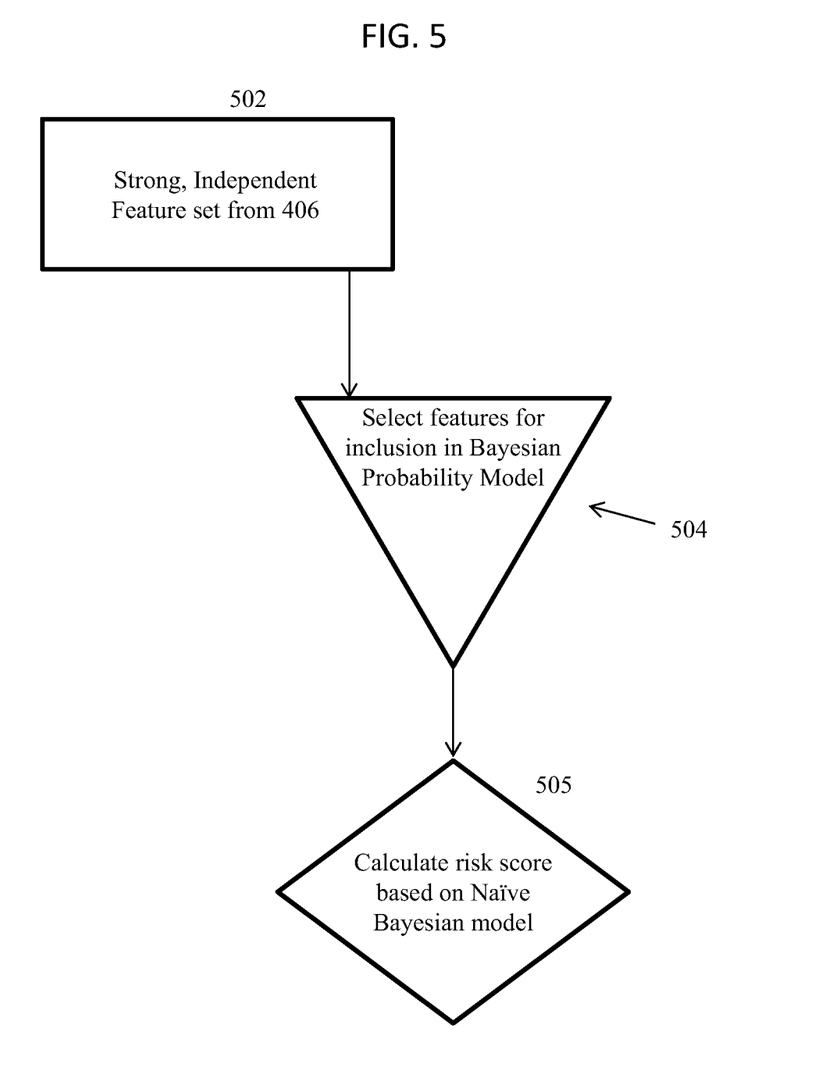
FIG. 5 is a diagram of the feature selection function of the method according to an embodiment.

As diagrammed in FIG. 5, and in accordance with an embodiment, the method for determining anomalous accounts further includes code operative to configure a processor to implement a step for selecting strong, independent features for use in a Bayesian model 504 and generating a risk score 506 using the Bayesian probability model. The selection step 504 preformed by such code selects features from the set generated in 406. In one configuration, the code is configured to select features from the conditional independent feature set in the selection step 504 which maximizes the product of the strength of the features in the set. Alternatively, the code is configured to select features with the lowest conditional confidence value. Furthermore, the selection step 504 can operate to select a set number of features for evaluating an unknown account.

In another example, and in no way limiting, the selection module 260 comprises code executing in a processor that calculates a subset of features to maximize the product of the strength of the using the following algorithm:

1. Sort all the features of accounts in descending order of strength into list L.
2. For i=0 to L.size( ) selected[i]=false EndFor 3. For i=0 to L.size( )
4. independent=true;
5. For j=0 to i
6. If (selected[j] && (conditional_correlation(i,j) >=0.2||confidence(i,j)>=0.95)) independent=false; break;
7. EndFor
8. If independent selected[i]=true
9. EndFor In another example, an embodiment generates a subset of strong features from the strong, independent feature set 502. The method includes a selection module 260 comprising a code executing in the processor that selects those features that have the highest strength value and the lowest conditional confidence value.

Alternatively, the selection module 260 and step 504 are configured to select a specific number of features within a given range of strength values. In another example, the features can be arranged, by a further step or code in the subset 255, in order of descending strength. The code and/or selection step 504 iterate over this list to select those features with the strongest conditional correlation value for inclusion in the probability model.

It is possible to maximize the risk score generated by the probability model by selecting an optimized number of features from the feature set 502. In one arrangement, code is configured such that features are selected from the strong, independent set at random to define a first random set. The code is configured such that the product of the signal strength values of the first random set are compared against the products of a second random feature set. The feature set with higher product value is then compared to a subsequently generated random feature set until a highest possible product value is obtained.

In an alternative arrangement, an optimal sub-set of features for use in the risk score is generated using heuristics, combinatorial optimization, Branch & Bound or other algorithms to select the optimal features from the feature set 502.

Those skilled in the art will recognize that it is possible to use other computational techniques to employ an algorithm to determine optimal and sub-optimal feature selection for use in a Bayesian probability model 504.

Bayesian Model

As diagrammed in FIG. 5, and in accordance with an embodiment, the method for determining anomalous accounts further includes a step for calculating a risk score 505 for an unknown account by inputting the selected strong, independent features into a Bayesian probability model. For example, and in no way limiting, a value R is determined in a step that implements a product module 264 which takes the product of the correlation values of selected features in the feature set 502. For a given account with selected strong, independent features $(k1, k2, \ldots, kn)$:

$$R=(S(k1)S(k2), \ldots, S(kn))$$

Thus, the larger the product of the strengths of the features of an account, the higher the risk score of that account where any pair of features is conditionally independent. The following features included in a Bayesian probability model demonstrate that:

$$P(\text{anomalous}|k1,k2,\ldots kn)+P(\text{non-anomalous}|k1,k2,\ldots kn)=1 \quad [P1]$$

$$P(\text{anomalous}|k1,k2,\ldots kn)=P(\text{anomalous})P(k1|\text{anomalous})P(k2|\text{anomalous})P(kn|\text{anomalous})/Z(\text{where } Z=(k1,k2,\ldots kn) \quad [P2]$$

Similarly:

$$P(\text{non-anomalous}|k1,k2,\ldots kn)=P(\text{non-anomalous})P(k1|\text{non-anomalous})P(k2|\text{non-anomalous})P(kn|\text{non-anomalous})/Z \quad [P3]$$

Taking [P2]/[P3] provides:

$$P(\text{anomalous}|k1,k2,\ldots kn)/P(\text{non-anomalous}|k1,k2,\ldots kn)=P(\text{anomalous})S(k1)S(k2)\ldots S(kn)/P(\text{non-anomalous}) \quad [P4]$$

Let $$F=P(\text{anomalous}|k1,k2,\ldots kn)/P(\text{non-anomalous}|k1,k2,\ldots kn)=P(\text{anomalous})S(k1)S(k2)\ldots S(kn)/P(\text{non-anomalous}) \quad [P5]$$

Considering the relationship between [1] and [5];

$$P(\text{anomalous}|k1,k2,\ldots kn)=F/(1+F) \quad [P6]$$

Thus, from [5] and [6] we can see the higher the product of $S(k1)S(k2)\ldots S(kn)$ the higher $P(\text{anomalous}|k1, k2, \ldots kn)$ and hence the higher the risk score.

Applying the Anomaly Score

The risk score so computed by suitably configured machine with one or more modules implementing as described above is used to scan accounts and highlight those accounts which are strongly anomalous. In an alternative operation, the risk score is used in a suitably configured machine to what was just described to trigger a manual or machine account reviewer to terminate an account based on the risk score. In a further arrangement, the machine is configured to use the risk score as a threshold value, above which, resources are temporarily withdrawn from the account in question.

Furthermore, data relating to each feature reviewed by code executing in the processor is used to generate a risk score for a particular unknown account and to update the features in the database with current information. As such, the system can be configured in one or more embodiments to dynamically update the strength and independence value of every feature it reviews as new unknown accounts are encountered.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 6:
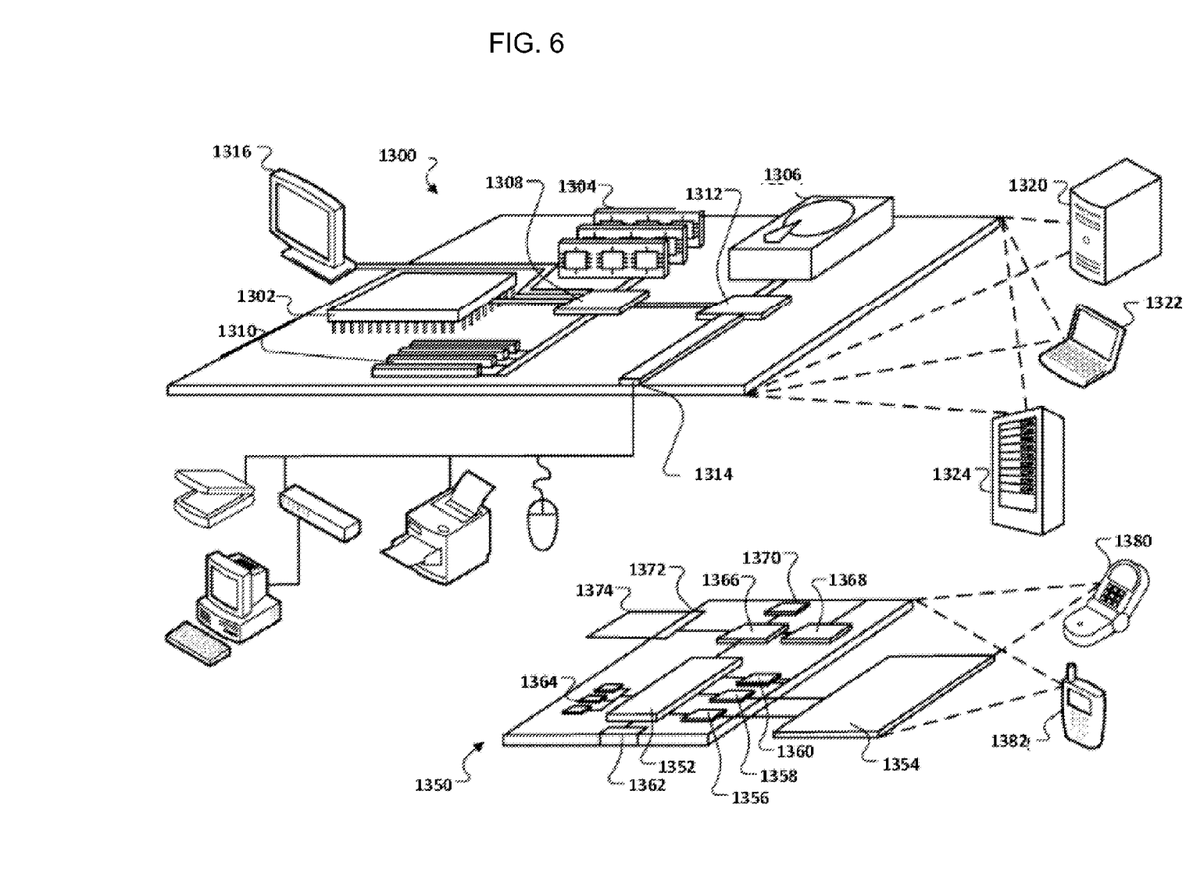
FIG. 6 shows an example of a computing device and a mobile computing device that can be used to implement the techniques described herein in an embodiment.

FIG. 6 shows an example of a computing device 1300 and a mobile computing device that can be used to implement the techniques described herein the present specification. The computing device 1300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit the implementations described and/or claimed in this document.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and can be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 can also be another form of computer-readable medium, such as a magnetic or optical disk.

The storage device 1306 is capable of providing mass storage for the computing device 1300. In some implementations, the storage device 1306 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1304, the storage device 1306, or memory on the processor 1302.

The high-speed interface 1308 manages bandwidth-intensive operations for the computing device 1300, while the low-speed interface 1312 manages lower bandwidth-intensive operations. Such allocation of functions is exemplary only. In some implementations, the high-speed interface 1308 is coupled to the memory 1304, the display 1316 (e.g., through a graphics processor or accelerator), and to the high-speed expansion ports 1310, which can accept various expansion cards (not shown). In the implementation, the low-speed interface 1312 is coupled to the storage device 1306 and the low-speed expansion port 1314. The low-speed expansion port 1314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1300 can be implemented in a number of different forms, as shown in the figure. For example, it can be implemented as a standard server 1320, or multiple times in a group of such servers. In addition, it can be implemented in a personal computer such as a laptop computer 1322. It can also be implemented as part of a rack server system 1324. Alternatively, components from the computing device 1300 can be combined with other components in a mobile device (not shown), such as a mobile computing device 1350. Each of such devices can contain one or more of the computing device 1300 and the mobile computing device 1350, and an entire system can be made up of multiple computing devices communicating with each other.

The mobile computing device 1350 includes a processor 1352, a memory 1364, and an input/output device such as a display 1354, a communication interface 1366, and a transceiver 1368, among other components. The mobile computing device 1350 can also be provided with a storage device, such as a micro-drive or other device, to provide additional storage. Each of the processor 1352, the memory 1364, the display 1354, the communication interface 1366, and the transceiver 1368, are interconnected using various buses, and several of the components can be mounted on a common motherboard or in other manners as appropriate.

The processor 1352 can execute instructions within the mobile computing device 1350, including instructions stored in the memory 1364. The processor 1352 can be implemented as a chipset of chips that include separate and multiple analog and digital processors. The processor 1352 can provide, for example, for coordination of the other components of the mobile computing device 1350, such as control of user interfaces, applications run by the mobile computing device 1350, and wireless communication by the mobile computing device 1350.

The processor 1352 can communicate with a user through a control interface 1358 and a display interface 1356 coupled to the display 1354. The display 1354 can be, for example, a TFT (Thin-Film-Transistor Liquid Crystal Display) display or an OLED (Organic Light Emitting Diode) display, or other appropriate display technology. The display interface 1356 can comprise appropriate circuitry for driving the display 1354 to present graphical and other information to a user. The control interface 1358 can receive commands from a user and convert them for submission to the processor 1352. In addition, an external interface 1362 can provide communication with the processor 1352, so as to enable near area communication of the mobile computing device 1350 with other devices. The external interface 1362 can provide, for example, for wired communication in some implementations, or for wireless communication in other implementations, and multiple interfaces can also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 can also be provided and connected to the mobile computing device 1350 through an expansion interface 1372, which can include, for example, a SIMM (Single In Line Memory Module) card interface. The expansion memory 1374 can provide extra storage space for the mobile computing device 1350, or can also store applications or other information for the mobile computing device 1350. Specifically, the expansion memory 1374 can include instructions to carry out or supplement the processes described above, and can include secure information also. Thus, for example, the expansion memory 1374 can be provided as a security module for the mobile computing device 1350, and can be programmed with instructions that permit secure use of the mobile computing device 1350. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1364, the expansion memory 1374, or memory on the processor 1352. In some implementations, the computer program product can be received in a propagated signal, for example, over the transceiver 1368 or the external interface 1362.

The mobile computing device 1350 can communicate wirelessly through the communication interface 1366, which can include digital signal processing circuitry where necessary. The communication interface 1366 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1368 using a radio-frequency. In addition, short-range communication can occur, such as using a Bluetooth, WiFi, or other such transceiver (not shown). In addition, a GPS (Global Positioning System) receiver module 1370 can provide additional navigation- and location-related wireless data to the mobile computing device 1350, which can be used as appropriate by applications running on the mobile computing device 1350.

The mobile computing device 1350 can also communicate audibly using an audio codec 1360, which can receive spoken information from a user and convert it to usable digital information. The audio codec 1360 can likewise generate audible sound for a user, such as through a speaker, e.g., in a handset of the mobile computing device 1350. Such sound can include sound from voice telephone calls, can include recorded sound (e.g., voice messages, music files, etc.) and can also include sound generated by applications operating on the mobile computing device 1350.

The mobile computing device 1350 can be implemented in a number of different forms, as shown in the figure. For example, it can be implemented as a cellular telephone 1380. It can also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for evaluating a status of an unknown user account, the method comprising;
   accessing a set of features associated with a plurality of known anomalous user accounts stored in a database, wherein each feature accessed is present in an unknown status user account;
   computing for a given feature using code executing in a processor of a computer, a conditional correlation value corresponding to the probability of a specific feature occurring in a particular unknown user account and a dependence value corresponding to a conditional confidence that one feature is independent of at least one feature;
   generating a first subset of features in the unknown user account using code executing in the processor, in which each feature in the first subset has a correlation value above a minimum threshold value and a dependence value below a maximum correlation value;
   calculating a risk score for the unknown user account from at least one of the correlation values of the features in the first subset using code executing in the processor;
   tagging the unknown user account for review by an account reviewer when the risk score exceeds a threshold value using code executing in the processor;
   determining, by the computer, that the risk score exceeds the threshold value; and
   responsive to determining that the risk score exceeds the threshold value, temporarily withdrawing at least one resource from the unknown user account.

2. The method of claim 1, wherein the risk score is calculated using code comprising a Naïve Bayesian algorithm.

3. The method of claim 2, further comprising:
   maximizing the risk score of the anomalous user account.

4. The method of claim 3, further comprising:
   generating a second subset of features by selecting features having a correlation value above a correlation threshold and a dependence value below a dependence threshold using code executing in the processor;
   calculating the risk score using only features in the second subset using code executing in the processor.

5. The method of claim 1, wherein the risk score is generated by calculating the product of the correlation values of each feature in the subset using code executing in the processor.

6. The method of claim 2, further comprising
   accessing the database of the known anomalous user accounts using code executing in the processor,
   updating the data in the database using code executing in the processor;
   calculating revised values for the correlation value and dependence values for each of the features in the database using code executing in the processor;
   generating a revised risk score for each anomalous user account in the database using code executing in the processor.

7. The method of claim 1, further comprising identifying one unknown user account where the risk score exceeds the threshold as an anomalous user account using code executing in the processor.

8. The method of claim 1, further comprising disabling an account based on the risk score using code executing in the processor.

9. A computer implemented method for detecting the status of an unknown instance in a population of instances, the method comprising;
   accessing a set of features associated with a plurality of known class of instances stored in a database;
   computing for a given feature, a correlation value corresponding to the probability of a specific feature occurring in a particular class of instance and a dependence value corresponding to the degree of dependence between the given feature and at least one other feature using code executing in a processor of the computer;
   generating a first subset of features in the unknown instance, in which each feature in the subset has a correlation value above a minimum threshold value and a dependence value below a maximum correlation value using code executing in the processor;

selecting at least one feature from the first subset for inclusion in a second subset of features based on the dependence value of each feature using code executing in the processor;

selecting at least one feature from the first subset for inclusion in a third subset of features based on the correlation value of each feature using code executing in the processor;

comparing a first risk score generated from the features in the second subset, and a second risk score calculated from the features in the third subset and selecting the higher value using code executing in the processor;

applying higher value as a risk score to the unknown instance using code executing in the processor;

flagging the unknown instance if the risk score exceeds a threshold value using code executing in the processor;

determining, by the processor, that the risk score exceeds the threshold value; and responsive to determining that the risk score exceeds the threshold value, temporarily withdrawing at least one resource from the unknown instance.

10. The method of claim 9, wherein the risk score is calculated using code comprising a Naïve Bayesian algorithm.

11. The method of claim 9, wherein the risk score is generated by calculating the product of the correlation values of each feature in the sub-set using code executing in the processor.

12. The method of claim 9, further comprising identifying an unknown instance as the particular class of instance when the risk score exceeds the threshold using code executing in the processor.

13. The method of claim 9, further comprising applying, by the at least one processor using code executing in the processor, an algorithm to compute the dependence value by:
- identifying, by the at least one processor, a subset of known anomalous accounts, each having a feature in common with the unknown instance;
- calculating, by the at least one processor, the correlation and dependence value of each common feature;
- defining, by the at least one processor, a minimum correlation value and dependence value; and
- evaluating, by the at least one processor, the risk score of an unknown account using features with the at least the minimum correlation value and dependence value.

14. The method of claim 9, wherein generating the sub-set of features further includes optimizing the selection of features for the maximum possible risk score by evaluating the features with one or more of a heuristics algorithm, combinatorial optimization, Branch & Bound algorithm using code executing in the processor.

15. The method of claim 9, further comprising using code executing in the processor automatically instructing an account review system to disable an account based on the risk value score.

* * * * *